Sept. 23, 1969  S. F. DOBRANSKI ET AL  3,468,027
INSTRUMENT FOR ORIENTATING DENTAL CASTS
Filed April 15, 1966

INVENTORS
Stephen F. Dobranski
Raymond J. Curcio
BY Littlepage & Quaintance
ATTORNEYS

United States Patent Office 3,468,027
Patented Sept. 23, 1969

3,468,027
INSTRUMENT FOR ORIENTATING DENTAL CASTS
Stephen F. Dobranski, 5 Cornell Road, Cranford, N.J. 07016, and Raymond J. Curcio, 1036 Ambay Ave., Edison, N.J. 08817
Filed Apr. 15, 1966, Ser. No. 542,802
Int. Cl. A61c 19/00
U.S. Cl. 32—1                                      4 Claims

ABSTRACT OF THE DISCLOSURE

An apparatus for accurately orientating oral anatomical models on the ideal plane of occlusion having in the same plane a first arm positioned to locate the two hamular notches, a second arm, which is adjusted to be positioned to locate the midpoint of the incisal papilla, and means to indicate when the three points formed by the two hamular notches and the midpoint of the incisal papilla are in a horizontal plane; and the method of using the apparatus to determine the ideal plane of occlusion for said oral anatomical models.

---

Figure 1:
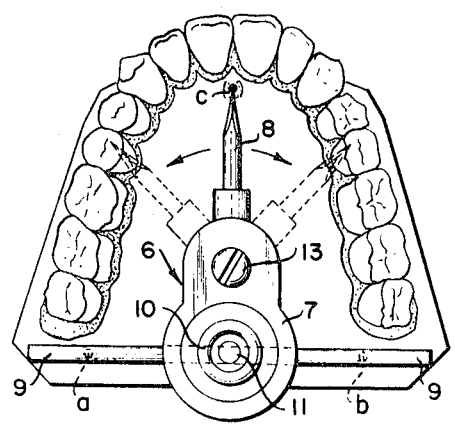

This invention relates to a novel dental instrument and more particularly to a dental instrument for locating and orientating planes parallel to a plane formed by three critical oral abatomical points which lie in a plane parallel to the ala-tragus plane and the interpupillary plane which are parallel to the ideal plane of occlusion.

The most commonly used instrument for orientating a pair of upper and lower dental casts with reference to the ideal plane of occlusion is the face bow. In using the face bow, the upper cast or the lower cast are related to the condyles. This cast is fastened to the corresponding frame of an articulator, then the other cast is positioned in relation to cast already mounted in a well known manner by the use of a centric bite and secured to the other frame of the articulator. The accuracy of the face bow method of orientating dental casts is contingent on the accuracy of a series of related steps; time and individual skill are important factors in its success and the proper orientation of the upper and lower casts still necessitates a considerable amount of guess work.

This invention provides a dental instrument which we call a modilator, that avoids the prior art problems by accurately relating a horizontal plane that is parallel to the ideal occlusal plane, containing three anatomical points on the patient's upper jaw, to the bases of the dental casts of the upper and lower jaws.

It should be noted that the true anatomical plane and the dental instrument or modilator of this invention can be utilized in all phases of dentistry, such as in forming diagnostic models, orthodontic models, bite correction models, and in full denture construction, partial denture construction, oral reconstruction, and oral dynamics and oral orthopedics; and that this instrument can be used to orient all dental casts, edentulous, diagnostic and orthodontic models etc., in the true occlusal plane.

An important object of this invention is to provide a simplified method of producing properly orientated dental casts and artificial dentures.

Another important object of this invention is to provide a simplified method for forming properly orientated bases for all complete anatomical dental casts which are parallel to the occlusal plane.

Another important object of this invention is to provide an apparatus that will eliminate the use of a face bow and its inaccuracies.

Another object of this invention is to provide a dental instrument to help form oriented bases for the mandibular and maxillary casts which are parallel to the occlusal plane regardless of the presence or absence of teeth or their position.

Another object of this invention is to provide a simple, compact, and inexpensive instrument for paralleling the occlusal plane to the established planes of the face.

Other features of this invention reside in the construction and arrangement of the parts hereinafter described and particularly pointed out in the appended claims.

Figure 2:
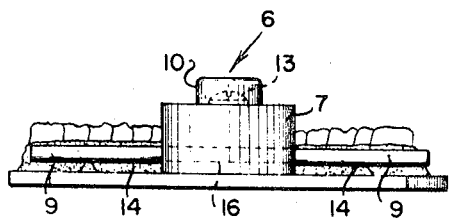
Figure 3:
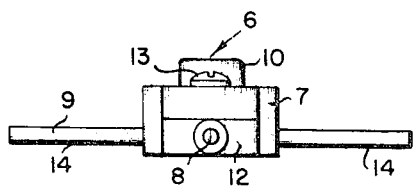
Figure 4:
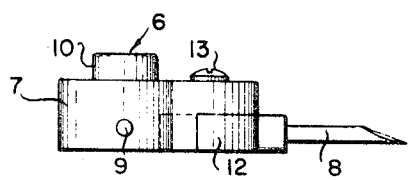
Figure 5:
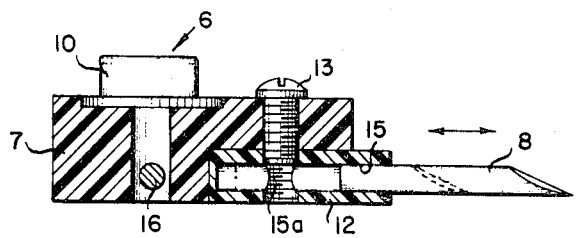

In the accompanying drawings:

FIGURE 1 is a top plane view of the modilator of this invention positioned on a model upper denture;
FIGURE 2 is a rear elevation view of the modilator on a model upper denture;
FIGURE 3 is a front elevation view of the modilator;
FIGURE 4 is a side elevation view of the modilator; and
FIGURE 5 is a section view of a side elevation.

The dental instrument of this invention 6 has a supporting housing 7 that holds and allows the adjustable movement of arms 8 and 9. Arms 8 and 9 must lie in the same plane. A level meter 10 having an indicator bubble gage 11 that indicates the position of a horizontal plane is attached to the top of housing 7. Adjustable arm 8 is positioned in a movable disk 12 which is pivotably attached to housing 7 by set screw 13 about which disk 12 pivots. As shown in FIGURE 5 adjustable arm 8 may move in and out of holes 15 in disk 12 and 15a in set screw 13. In use, the position of arm 8 in disk 12 is adjusted so that the free end coincides with the midpoint of the incisal papilla, which is an anatomical point which in 90% of the people is on an imaginary line that is perpendicular to arm 9 which is positioned over an imaginary line connecting the two corresponding deepest points of the hamular notches. These three points are parallel to the ideal plane of occlusion.

Adjustable arm 9 moves in and out of cylindrical hole 16 located in housing 7. In use corresponding portions react on the deepest points of the hamular notches a and b. The use of knife edges or a flat base, not shown, may be a desirable embodiment of this invention to obtain a more stable seat, but the use of knife edges are optional.

The specific shape or design of housing 7, adjustable arms 8 and 9, disk 12 and level meter 10 is optional and can be varied in any manner desired. The factors of construction of this apparatus that are critical are the relative position of arms 8 and 9 and level meter 10. The arms 8 and 9 must be in the same plane and they must be in a horizontal position when the level meter is in a horizontal position. Optionally arm 9 may be in two pieces instead of the single arm shown in the drawings.

The critical relationships outlined in the preceding paragraph could be provided in a simple embodiment of this invention having a first arm corresponding to 9 which would locate the two points a and b which correspond to the deepest portions of the hamular notches, a second arm, corresponding to arm 8, that could be adjusted by moving through a hole in the first arm to align the end point of arm 8 with point c the midpoint of the incisal papilla, and a level gauge attached to the top of either one of the arms.

An advantage in using a housing 7 having a pivoting disk similar to disk 12 or a similar housing with pivoting means for aligning the end point of arm 8 with the midpoint of the incisal papilla or point c is that point c is not always centered in the patient's mouth on a line perpendicular to the line joining the deepest points of the hamular notches and arm 8 may have to be pivoted to align with this point. Furthermore, housing for the arms, even one that does not pivot, provides a substantial base for holding the adjustable arms 8 and 9 and the level gauge 10.

The method of using the modilator of this invention to form properly orientated dental casts or models is simple and direct. Impressions are taken of the upper and lower jaws and models of these impressions are made by using standard methods and materials such as gypsum or plaster of Paris. In a more technical sense maxillary anatomical casts, including the three anatomical points hamular notches and the midpoint of the incisal papilla, and mandibular anatomical casts are formed by pouring a dental casting compound, such as plaster of Paris or gypsum, into the corresponding impression. The maxillary cast, by placing the arm 9 on the hamular notches and the end point of arm 8 on the midpoint of the incisal papilla, is marked at the midpoint of the anterior incisal papilla and the deepest points of the hamular notches. The modilator is oriented on the maxillary cast in the manner shown in FIGURES 1 and 2 to properly orientate these three points. A dental molding composition, such as gypsum or some equivalent molding composition is mixed and puddled on a flat glossy level surface from which it can be easily removed. The maxillary cast with modilator in place is built up by pressing the maxillary cast gently into the mound of gypsum product with the teeth facing up and the top base facing down until the level meter 10 indicates that the three anatomical points of the maxillary cast are in a level plane. When the thus built up product is set the model is removed and the mandibular cast is occluded with the maxillary cast. The modilator is placed on the top base of the maxillary cast. The gypsum product is mixed and puddled and the occluded models are pressed gently into the puddled mass with the lower base of the mandibular cast facing down until the level gage on the modilator indicates it is in a level plane. After the now built up mandibular cast has set, the maxillary and mandibular casts are trimmed around the perimeter without touching the bases since they are parallel to the true occlusal plane.

Although only one preferred embodiment of this invention has been illustrated in detail other embodiments of the invention would include, for instance, that one of the three arms leading from the housing be adjustable, preferably both longitudinally and rotationally, for the length of the arms positioned on the hamular notches obviously is not critical. One could position, if one so desired, a fixed base line on the midpoint of the incisal papilla and one of the deepest points of the hamular notches and use an adjustable arm to locate the deepest point on the other hamular notch.

What is claimed is:

1. A dental modulator for orienting oral anatomical models by locating a plane parallel to the ideal plane of occlusion in which three oral anatomical points lie, said modulator having a first straight arm positioned to locate the two hamular notch points, a second arm which is adjustable about a pivot point midway between a line perpendicular to the center of said first arm within the plane formed by said hamular notches located by said first arm and the unpivoted end point of said second arm which is movable to be positioned on the midpoint of the incisal papilla and a leveling means to indicate when said three points are in a horizontal plane.

2. The dental modulator of claim 1, wherein said arms and said indicator means are provided with a housing which holds said arms in the same plane and holds said indicator in a plane parallel to said arms.

3. A method of orientating dental casts to obtain the ideal plane of occlusion, comprising building up the maxillary cast by pressing the top base of the maxillary cast into a dental molding composition on a flat surface, positioning said cast so that the plane formed by the midpoint of the anterior incisal papilla and the two deepest points of the hamular notches is parallel to said flat surface, and allowing said built up maxillary cast to set.

4. The method of orientating dental casts of claim 3, wherein after said maxillary cast has set, said cast is occluded with the mandibular cast, the lower base of said mandibular cast of said occluded casts is built up by pressing said lower base into a dental molding composition on a flat surface until the top base of said maxillary cast is parallel to said flat surface, and allowing said built up mandibular cast to set.

References Cited

UNITED STATES PATENTS 2,618,068  11/1952  Apple _____ 32—67

ROBERT PESHOCK, Primary Examiner